Aug. 11, 1936.  W. B. NORMELLI  2,050,959
PERIODIC ABSORPTION REFRIGERATING APPARATUS
Filed June 29, 1932   5 Sheets-Sheet 1

INVENTOR
W. B. Normelli

By Robb & Robb
ATTORNEYS

Aug. 11, 1936. W. B. NORMELLI 2,050,959
PERIODIC ABSORPTION REFRIGERATING APPARATUS
Filed June 29, 1932 5 Sheets-Sheet 4

INVENTOR
W. B. Normelli

By
Robb & Robb
ATTORNEYS

Patented Aug. 11, 1936

2,050,959

UNITED STATES PATENT OFFICE 2,050,959

PERIODIC ABSORPTION REFRIGERATING APPARATUS

Wulff Berzelius Normelli, Berlin, Germany

Application June 29, 1932, Serial No. 620,036
In Germany July 3, 1931

16 Claims. (Cl. 62—118)

My invention relates to a periodic absorption refrigerating apparatus and particular methods for controlling the temperature in a cooling chamber.

When operating absorption refrigerating apparatus a given temperature must be maintained in the cooling chamber, sufficient to keep the products to be cooled fresh at all times. The refrigeration output required for this purpose is variable depending upon the time of day and season. Care should be taken to attain the desired temperature in the cooling chamber by a supply of the necessary amount of cold. To this end, special control devices have been hitherto employed which affect the production of cold according to the quantity of cold to be produced. With such control methods the apparatus are not fully utilized.

According to the invention the cold produced during the absorption period is stored up in a space insulated from the cooling chamber and thence, as may be required, transferred by special means to the cooling chamber. Since it is not necessary to influence the absorption process by control devices, the efficiency of the apparatus may thus be fully utilized. The total amount of cold capable of being supplied during the operating time of the refrigerator will be stored up in a cold accumulator and thence transferred, as may be required, to the cooling chamber. The cold accumulator is preferably designed as a melting chamber, the latter being preferably filled with a liquid, the freezing point of which lies below 0° C.

It is of particular advantage to equip the refrigerator with various generator-absorbers cooperating with a common cold accumulator. The generator-absorbers are preferably operated in such a manner that when any one of the generator-absorbers is being operated as generator, the others are operated as absorbers. By selecting a convenient number of generator-absorbers and suitable dimensions, it is possible to design a refrigerator in such a manner that it has a uniform wattage, which is very important from the standpoint of tariff policy, since the public utilities lay stress upon the desirability of receiving from the consumers a possibly uniform load. Particularly at night when the supply companies deliver current at low rates the generator absorbers mounted in the refrigerators may be fully utilized for the production of cold. The cold may then be consequently withdrawn from the cold accumulator at any desired time.

Figure 1:
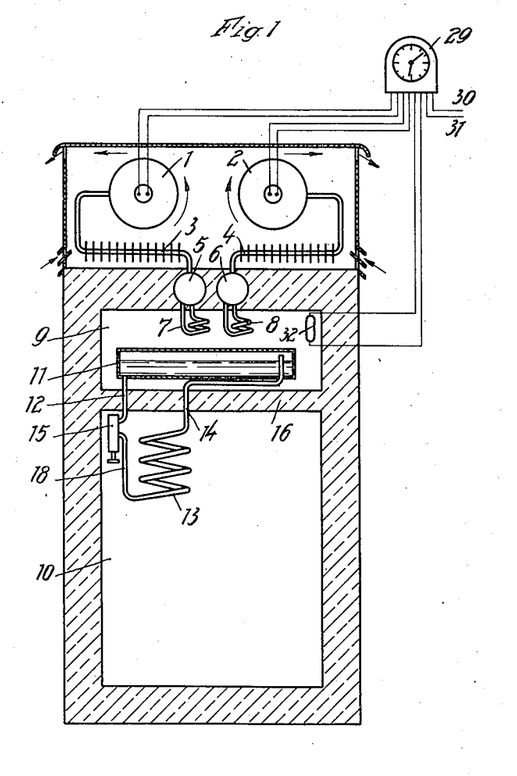
Fig. 1 is a vertical sectional view through one embodiment of my invention.

Referring to the drawings, Fig. 1 shows a refrigerator which is equipped with two air-cooled periodic absorption refrigerating apparatuses operating with solid absorption media. 1 and 2 denote the generator-absorbers containing a solid absorbent consisting, for instance, of calcium chloride saturated with ammonia. From the generator-absorbers the refrigerating medium passes during the generating period through the condensers 3 and 4 into the collecting vessels 5, 6 communicating with the evaporator coils 7, 8 which project into a special space 9 designed as a melting accumulator.

This space is preferably filled with a liquid which, owing to the evaporation of the cooling medium contained in the evaporator coils 7 and 8, freezes to a solid mass which in turn melts upon application of heat supplied from the cooling chamber 10. The cold accumulator is separated from the cooling chamber 10 by an insulating layer 16. Both absorption refrigerating apparatus operate alternately and store up the cold produced by the evaporator coils 7 and 8 in the cold accumulator 9. To transfer the cold thus stored up to the cooling chamber 10, a system in which auxiliary liquid circulates is employed, consisting of a condenser 11 disposed in the cold accumulator 9 and of an evaporator coil 13 located in the cooling compartment 10. From the condenser 11, a conduit 12 leads to the evaporator coil 13, while the evaporated auxiliary liquid passes from the cooling compartment 10 into the condenser 11 through the conduit 14.

To maintain the temperature in the cooling chamber 11 at a desired value, a valve 15 is provided in the conduit 12 and is controlled in accordance with the temperature prevailing in the cooling chamber 10. As soon as the temperature drops below the desired value the valve 15 closes so that the evaporation process of the auxiliary liquid is interrupted and a further supply of cold from the cold accumulator is consequently prevented. If a system for the transfer of an auxiliary liquid, as the one disclosed in Fig. 1 is employed with two connecting conduits between the evaporator and the condenser, the condenser 11 is preferably dimensioned in such a manner that when the valve 15 is closed, the total amount of liquid contained in the evaporator 13 may be taken up by the condenser so that a further transfer of cold is prevented.

The heating coils of both generator absorbers 1 and 2 are connected to a supply circuit 30, 31 through a contact making clock 29. This clock switches the heating coils on and off periodically in such a manner that during the heating period of one of the generator absorbers, the other operates as absorber. In case sufficient cold is stored up in the accumulator 9 a thermostat 32 arranged therein takes care that a further production of cold is prevented as soon as the temperature drops below a predetermined value. By closing the contact of the thermostat, the switching in of the heating coils is prevented, so that a generating period is limited or one or more periods may be omitted.

It is preferable to use a liquid whose vapor pressure lies somewhat above the atmospheric pressure as medium for transferring cold from the cold accumulator 9 to the cooling chamber 10. For this purpose, ammonia or sulphur dioxide may, for instance, be utilized. The use of sulphur dioxide has the advantage that the conduits may be made of copper.

Figure 2:
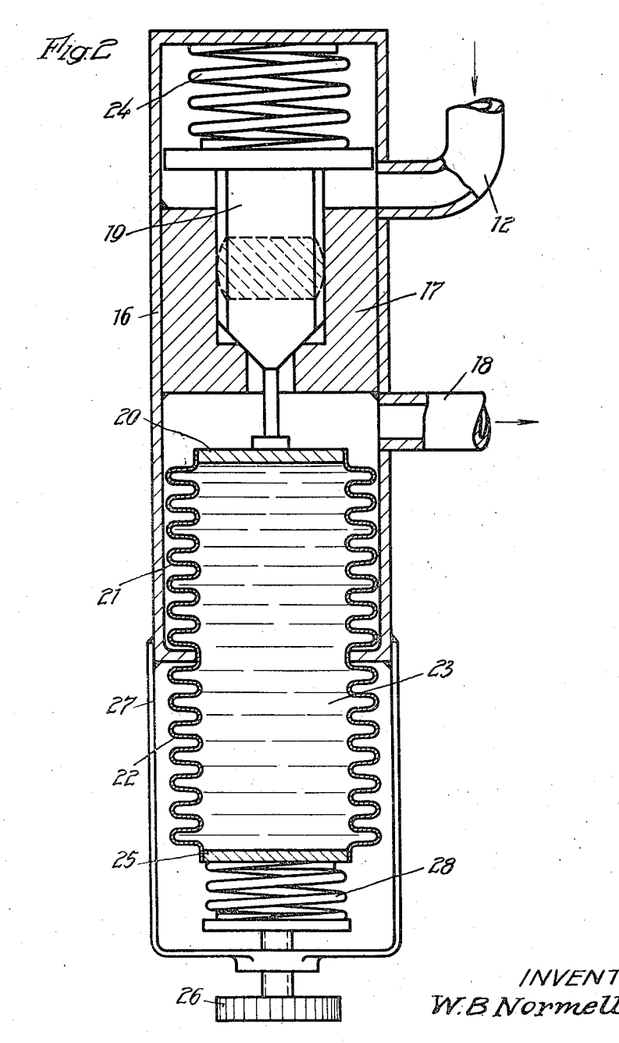
Fig. 2 is a sectional view of the control valve used in the circuit of the cold transfer system of the apparatus shown in Fig. 1.

In Fig. 2 is shown a sectional view of the valve 15. The latter consists of a cylindrical casing 16 in which the valve seat 17 is fixedly mounted. The conduit 12 leading from the cold accumulator 9, enters the casing 16 at a point above the valve seat 17, and the discharge conduit 18 for the liquid is arranged below the valve seat. The valve body 19 cooperates with a cover plate 20 which is raised or lowered by a thermostatically controlled bellows 21 in accordance with the temperature prevailing in the cooling chamber 10. The cover plate 20, the bellows 21 and a bellows 22 connected to the container and a base plate 25 enclose a space 23 completely filled up with a liquid, which space is expanded or contracted as a result of the temperature variations prevailing in the cooling chamber 10. The cover plate 20 and the valve body 19 associated therewith are raised upon a rise in temperature against the pressure of a spring 24 so that in this case a flow of liquid takes place. To adjust to a predetermined temperature at which the valve should be operated an adjusting screw 26 is used which is rotatably mounted in a strap 27 attached to the casing 16. By adjusting the screw 26, the bellows 22 is more or less compressed by means of a spring 28. At the same time this adjusting device protects the valve during the transport or when out of operation from being injured.

Figures 3, 4, 6:
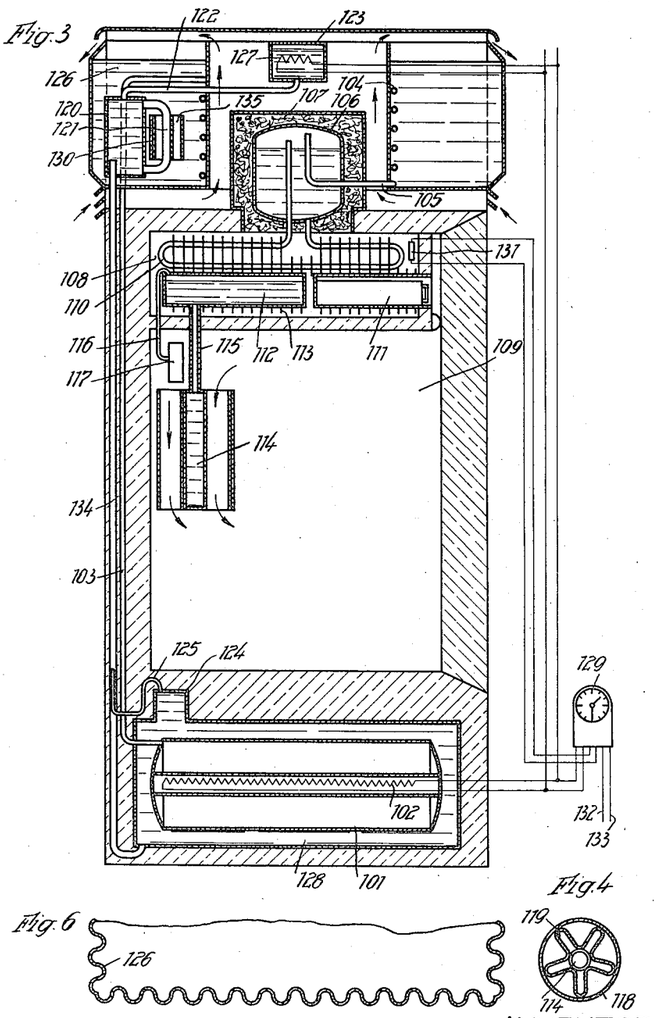
Fig. 3 is a vertical sectional view of a modified form of my invention.
Fig. 4 is a horizontal sectional view through the evaporator shown in Fig. 3.
Fig. 6 is a detail section of a part of the wall of the liquid accumulator used in the apparatus shown in Fig. 3.

Fig. 3 shows another embodiment of a refrigerator, which is equipped with a periodic absorption refrigerating apparatus operating with solid absorption media. The generator absorber 101 is located in the lower part of the refrigerator. It is heated by a heating coil 102 during the generating period, thereby expelling the refrigerating medium, for instance ammonia, through a conduit 103 into a condenser 104 arranged in the upper part of the refrigerator. From the condenser, the liquefied ammonia passes through a conduit 105 into a collecting vessel 106 which is surrounded with an aluminum foil insulation 107. 108 is a cold accumulator insulated from the cooling chamber 109. The cold produced by the apparatus is stored up in the accumulator and as may be required, transferred to the cooling chamber. An evaporator coil 110 is used for the transfer of cold from the collecting vessel 106. One end of the coil enters the collecting vessel at the lower part thereof, while the other end terminates above the surface of the liquid. Besides, an ice container 111 and a condenser 112 are located in the cold accumulator 108. The evaporator coil 110, the ice container 111 and the condenser 112 are provided with the common cooling ribs 113 so as to ensure an effective transfer of heat. The condenser 112 communicates with an evaporator 114 disposed in the cooling chamber 109 through a conduit 115. A conduit 116 leading from a control member 117 situated in the cooling chamber 109 enters the condenser 112 at the top.

The evaporator 114 and the condenser 112 are filled with a liquid to a marked level. The liquid evaporates in the evaporator 114 at the temperature which prevails in the cooling chamber. The vapor bubbles rise to the condenser 112 through the conduit 115 and are rapidly condensed within the liquid. The heat of evaporation is consequently absorbed from the cooling chamber 109 so that the desired cooling effect is attained.

Fig. 4 shows a cross-section of the evaporator 114. The latter is surrounded by a pipe 118 open at both ends. A steel corrugated circular air grid 119 is arranged in the space between both pipes so that the heat is conducted from the outer pipe 118 to the evaporator pipe 114. The air flows in the direction of the arrows as shown in Fig. 3 through the canals formed by the corrugated sheet and transfers the cold to the entire cooling chamber.

The control device 117 serves to control the transfer of cold from the accumulator 108 to the cooling chamber 109. With the aid of the control member 117 a decrease in pressure is caused in the system 112, 114, 115 upon a rise in temperature in the cooling chamber, whereas in the cooling chamber an increase in pressure takes place upon a drop of the temperature. Accordingly, the transfer of cold will be interrupted or initiated at a given cooling temperature depending upon the adjustment of the control member 117.

Figure 5:
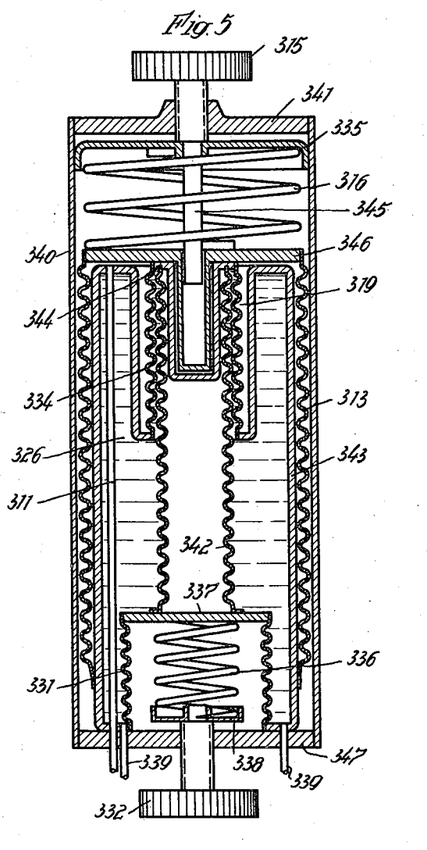
Fig. 5 is a sectional view through the control device for the cold transfer system shown in Fig. 3.

The control device 117 is shown in detail in Fig. 5. 326 is a container completely filled with a liquid. The walls of this container are formed by a jacket 343 and the bellows 334, 342, 331. The inlet conduits 339 serve to charge this container. Both bellows 334 and 342 are secured to a plate 344. As the bellows are disposed closely to each other the control device is very sensitive to temperature variations. The pressure chamber 319 of the control member is formed by a bellows 313, the outer wall of the jacket 343, the bellows 334 and by the plate 346. Both plates 344 and 346 are provided with downwardly extending central enlargements in the form of cylinders so as to engage each other and the guide pin 345 of the adjusting screw 315 is slidably movable in a central opening of the plate 346. This pin serves to limit the stroke of the control device in the upward direction. The control device is surrounded by a jacket 340 which is provided with two covers 341 and 347. The cover 341 is provided with a thread for the adjusting screw 315 which presses by means of a spring plate 335 a spring 316 against the closing plate 346 of the pressure chamber 319. The adjusting screw 315 is employed for a fine adjustment of the thermostatic device. The base plate 347 is also provided with a thread for the adjusting screw 332 which presses with the aid of a spring plate 338 a spring 336 against the cover 337 to which the bellows 331 and 342 are secured. A coarse adjustment of the thermostatic device is effected by the adjusting screw 332 which protects at the same time the control device from being injured during the transport or when out of operation. 311 is a pressure conduit communicating with the pressure chamber 319 and is connected with the conduit 116 entering the condenser 112 at the top. Thus it will be seen that upon a rise in temperature in the cooling chamber the liquid placed in the container 326 expands with the result that both bellows 334, 342, owing to the pressure exerted by the water, expand in the upward direction thereby causing the bellows 313 secured to the plate 346 to also move in an upward direction. Consequently, the pressure space 319 of the control device is enlarged, so as to cause a decrease in pressure which exerts an influence on the heat-transfer system in the above-described manner through the conduit 311. Upon a decrease in temperature in the cooling chamber, the liquid in the container 326 contracts thereby causing the reverse effect, i. e., an increase in pressure, in the pressure chamber 319.

The generator-absorber 101 shown in Fig. 3 is indirectly air-cooled during the absorption period. The generator-absorber 101 is surrounded by a cooling jacket 128, from the lower part of which a conduit 134 enters the container 120 disposed in the upper part of the refrigerator and to which a by-pass conduit 121 is connected. The conduit 122 leading from the container 123 also opens into the upper part of the container 120. The entire system for the transfer of heat consisting of the cooling jacket 128 and the conduit 134, the container 120 and the control container 123 is filled up to a marked level with a liquid. On the top of the cooling jacket 128, a collecting space 124 is arranged, which communicates with the rising conduit 134 through a vapor discharge conduit 125 which extends downwardly from the collecting space 124 and then for some distance upwardly in the conduit 134.

During the absorption period, the liquid contained in the cooling jacket 128 is evaporated and collected in the collecting chamber 124. As soon as the vapor pressure overcomes the pressure of the liquid column placed above the outlet of the conduit 125 the vapor is blown off and rises through the conduit 134 to the container 120 in which the vapor is rapidly condensed within the liquid. The blowing off of the vapor occurs at intervals, the duration of which depends upon the cooling time of the control container 123. The container 120 is arranged in a liquid accumulator 126 which is so designed (Fig. 6) as to be intensely cooled by air interiorly and exteriorly. Not only the heat of absorption, but also that of condensation is absorbed by the liquid contained in the vessel 120 and then carried off to outside atmosphere with the aid of the walls of the container 126. The condenser 104 for the refrigerating medium is wound around the inner walls of the central portion of the vessel 126.

The vapors, rising through the conduit 134 to the container 120 and condensing in this container, heat particularly the upper portion of the liquid contained therein intensely so as to cause a circulation through the by-pass conduit 121. To insure also in this case an effective transfer of heat, the by-pass conduit 121 is connected with a steel corrugated circular grid 135 which is surrounded by an outer pipe 130, such as shown in Fig. 4 for the evaporator in the cooling chamber.

In order to prevent an unnecessary amount of heat of the system from being carried off to outside atmosphere, the control container 123 is provided, in which a heating coil 127 is disposed which together with the heating coil 102 of the generator-absorber is connected to the supply circuit 132, 133 through a contact making clock 129. In this manner, the liquid contained in the vessel 123 will evaporate so as to cause an excess pressure in the system so that an evaporation of the auxiliary liquid is prevented during the generating period. A thermostat 131 disposed in the cold accumulator 108 closes its contact as soon as the temperature drops below a predetermined value, thus interrupting the heating circuit, and thereby restricting or, if desired, completely eliminating the heating period. It is advisable to dimension the cold accumulator in such a manner that the stored up cold, in the event of a generating and cooling period being omitted is sufficient to maintain the required cooling temperature in the refrigerator until a fresh production of cold takes place after the next following generating period.

Figure 7:
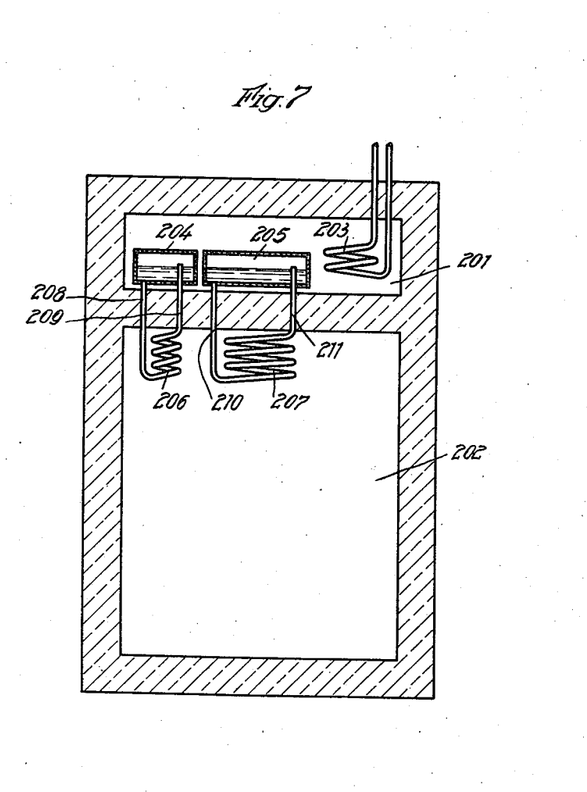
Fig. 7 is a diagrammatic sectional view showing a modified system of cold transfer for refrigerators of the type disclosed.

Fig. 7 shows a modified embodiment in which the temperature in the cooling chamber may be regulated in connection with the cold accumulator. 201 designates the cold accumulator and 202 the cooling chamber insulated therefrom. By means of an evaporator coil 203 cooperating preferably with a periodic absorption refrigerating apparatus, the cold is transferred to the accumulator. For the transfer of cold from the accumulator 201 to the cooling chamber 202 two auxiliary liquid systems are employed which are operated at different temperatures of evaporation of the auxiliary liquid contained therein. In this case the temperature of evaporation is preferably adjusted by the pressure of an inert gas contained in the system. However, exterior mechanical means may also be employed in order to bring the temperature of evaporation to a desired value. In the cold accumulator are placed two condensers 204 and 205 for the auxiliary liquids and in the cooling chamber the corresponding evaporator coils 206 and 207 which are connected to the condensers through the corresponding conduits 208, 209 and 210, 211 respectively. It is true that this apparatus does not permit of an exactly uniform temperature being maintained in the cooling chamber, but the results attained thereby are satisfactory for various practical purposes. The sensitivity of this apparatus to temperature variations may be increased by the use of a greater number of systems for the transfer of heat.

I claim as my invention:

1. In a refrigerating apparatus of the periodic absorption type, a cooling chamber, a cold accumulator having therein a medium adapted to store up the cold produced during the absorption period, said accumulator being insulated from said chamber, and means for transferring the refrigeration from the cold accumulator to the cooling chamber comprising a liquid circulating system in which the liquid is alternately evaporated and condensed and constitutes the heat conveying medium, and a control device arranged in said cooling chamber to influence the pressure in the transfer system aforesaid so as to cause an increase in pressure upon a drop of temperature prevailing in the cooling chamber and a decrease in pressure upon a rise in temperature in the cooling chamber.

2. A refrigerating system as claimed in claim 1 in which the control device includes a thermostatically controlled bellows arranged to reduce or increase the space in the heat transfer system incident to contraction or expansion.

3. A refrigerating system of the intermittently operating absorption type comprising a generator-absorber, a condenser, a collecting vessel for the liquid refrigerant, an evaporator connected to said vessel and connections for conveying the refrigerant from the generator-absorber to the evaporator and vice versa, a cooling chamber insulated from said vessel, a cold accumulator insulated both from said cooling chamber and said collecting vessel, said evaporator being in heat exchange relation with said cold accumulator, a medium in said cold accumulator for storing up the refrigeration produced during the absorption period and means for transferring refrigeration as may be required from the accumulator to the cooling chamber, the cold accumulator being so dimensioned that the refrigeration stored up during the absorption period suffices to maintain in the cooling chamber the desired temperature also during the heating period.

4. A refrigerating system of the intermittently operating absorption type comprising a generator-absorber, a condenser, a collecting vessel for the liquid refrigerant, an evaporator connected to said vessel and connections for conveying the refrigerant from the generator-absorber to the evaporator and vice versa, a cooling chamber insulated from said vessel, a cold accumulator insulated both from said cooling chamber and said collecting vessel, said evaporator being in heat exchange relation with said cold accumulator, a cold storing up agent in said accumulator adapted to freeze during the evaporation of the refrigerant, and means for transferring refrigeration as may be required from the accumulator to the cooling chamber, the cold accumulator being so dimensioned that the refrigeration stored up during the absorption period suffices to maintain in the cooling chamber the desired temperature also during the heating period.

5. A refrigerating system as set forth in claim 4 in which the refrigeration storing up agent employed has a freezing point lying below 0° C.

6. A refrigerating system comprising a plurality of intermittently operating absorption apparatus which are alternately heated, each of said absorption apparatus comprising a generator-absorber, a condenser, a collecting vessel for the liquid refrigerant, an evaporator connected to said collecting vessel and connections for conveying the refrigerant from the generator-absorber to the evaporator and vice versa, the collecting vessels of the single absorption apparatus being insulated from one another, a cooling chamber insulated from said vessels, a cold accumulator insulated from said cooling chamber and from said vessels, the evaporators of the absorption apparatus being in heat exchange relation with said cold accumulator, a medium in said cold accumulator for storing up the refrigeration produced during the absorption period, and means for transferring refrigeration as may be required from the accumulator to the cooling chamber, the cold accumulator being so dimensioned that the refrigeration stored up during the absorption period suffices to maintain in the cooling chamber the desired temperature also during the heating period.

7. A refrigerating system of the intermittently operating absorption type comprising a generator-absorber, a condenser, a collecting vessel for the liquid refrigerant, an evaporator connected to said vessel and connections for conveying the refrigerant from the generator-absorber to the evaporator and vice versa, a cooling chamber insulated from said vessel, a cold accumulator insulated both from said cooling chamber and said collecting vessel, said evaporator being in heat exchange relation with said cold accumulator, a medium in said cold accumulator for storing up the refrigeration produced during the absorption period, and means for transferring refrigeration as may be required from the accumulator to the cooling chamber, the cold accumulator being so dimensioned that the refrigeration stored up during the absorption period suffices to maintain in the cooling chamber the desired temperature also during the heating period, said means for the transfer of cold comprising a system which contains a heat transfer liquid, and means in said transfer system for controlling the transfer of heat between the cooling chamber and the cold accumulator.

8. A refrigerating system of the intermittently operating absorption type comprising a generator-absorber, a condenser, a collecting vessel for the liquid refrigerant, an evaporator connected to said vessel and connections for conveying the refrigerant from the generator-absorber to the evaporator and vice versa, a cooling chamber insulated from said vessel, a cold accumulator insulated both from said cooling chamber and said collecting vessel, said evaporator being in heat exchange relation with said cold accumulator, a medium in said cold accumulator for storing up the refrigeration produced during the absorption period, and means for transferring refrigeration as may be required from the accumulator to the cooling chamber, the cold accumulator being so dimensioned that the refrigeration stored up during the absorption period suffices to maintain in the cooling chamber the desired temperature also during the heating period, said means for the transfer of cold comprising a system in which a liquid serving for the transfer of heat operates, a conduit therefor, and a valve in said conduit which operates in accordance with the temperature prevailing in the cooling chamber.

9. A refrigerating system of the intermittently operating absorption type comprising a generator-absorber, a condenser, a collecting vessel for the liquid refrigerant, an evaporator connected to said vessel and connections for conveying the refrigerant from the generator-absorber to the evaporator and vice versa, a cooling chamber insulated from said vessel, a cold accumulator insulated both from said cooling chamber and said collecting vessel, said evaporator being in heat exchange relation with said cold accumulator, a medium in said cold accumulator for storing up the refrigeration produced during the absorption period, and means for transferring refrigeration as may be required from the accumulator to the cooling chamber, the cold accumulator being so dimensioned that the refrigeration stored up during the absorption period suffices to maintain in the cooling chamber the desired temperature also during the heating period, said means for the transfer of cold comprising a system in which a liquid serving for the transfer of heat operates, a conduit therefor, and a valve in said conduit, and means for opening said valve upon a rise in temperature and for closing the same upon a drop in temperature in the cooling chamber.

10. A refrigerating system of the intermittently operating absorption type comprising a generator-absorber, a condenser, a collecting vessel for the liquid refrigerant, an evaporator connected to said vessel and connections for conveying the refrigerant from the generator-absorber to the evaporator and vice versa, a cooling chamber insulated from said vessel, a cold accumulator insulated both from said cooling chamber and said collecting vessel, said evaporator being in heat exchange relation with said cold accumulator, a medium in said cold accumulator for storing up the refrigeration produced during the absorption period, and means for transferring refrigeration as may be required from the accumulator to the cooling chamber, the cold accumulator being so dimensioned that the refrigeration stored up during the absorption period suffices to maintain in the cooling chamber the desired temperature also during the heating period, said means for the transfer of cold comprising a system in which a liquid serving for the transfer of heat operates, a conduit therefor and a valve in said conduit, means for opening said valve upon a rise in temperature and for closing the same upon a drop in temperature in the cooling chamber, and means for adjusting said temperature responsive means so as to operate the valve at a predetermined temperature.

11. A refrigerating system of the intermittently operating absorption type comprising a generator-absorber, a condenser, a collecting vessel for the liquid refrigerant, an evaporator connected to said vessel and connections for conveying the refrigerant from the generator-absorber to the evaporator and vice versa, a cooling chamber insulated from said vessel, a cold accumulator insulated both from said cooling chamber and said collecting vessel, said evaporator being in heat exchange relation with said cold accumulator, a medium in said cold accumulator for storing up the refrigeration produced during the absorption period, and means for transferring refrigeration as may be required from the accumulator to the cooling chamber, the cold accumulator being so dimensioned that the refrigeration stored up during the absorption period suffices to maintain in the cooling chamber the desired temperature also during the heating period, said cold transfer means comprising a plurality of liquid circulating systems in which the liquids circulate by alternate evaporation and condensation and which operate at different temperatures of evaporation.

12. A refrigerating system of the intermittently operating absorption type comprising a generator-absorber, a condenser, a collecting vessel for the liquid refrigerant, an evaporator connected to said vessel and connections for conveying the refrigerant from the generator-absorber to the evaporator and vice versa, a cooling chamber insulated from said vessel, a cold accumulator insulated both from said cooling chamber and said collecting vessel, said evaporator being in heat exchange relation with said cold accumulator, a medium in said cold accumulator for storing up the refrigeration produced during the absorption period, and means for transferring refrigeration as may be required from the accumulator to the cooling chamber, the cold accumulator being so dimensioned that the refrigeration stored up during the absorption period suffices to maintain in the cooling chamber the desired temperature also during the heating period, a heating medium for the generator-absorber, a heating medium conduit therefor, and a thermostat in said cold accumulator so adjusted as to interrupt said heating medium circuit upon a decrease of the temperature below a predetermined value, whereby a heating period is shortened or completely cut off as may be required.

13. A refrigerating system of the intermittently operating absorption type comprising a generator-absorber, a condenser, a collecting vessel for the liquid refrigerant, an evaporator connected to said vessel and connections for conveying the refrigerant from the generator-absorber to the evaporator and vice versa, a cooling chamber insulated from said vessel, a cold accumulator insulated both from said cooling chamber and said collecting vessel, said evaporator being in heat exchange relation with said cold accumulator, a medium in said cold accumulator for storing up the refrigeration produced during the absorption period, and means for transferring refrigeration as may be required from the accumulator to the cooling chamber, a time control device for regulating the generator heating, and means for interrupting the supply of the heating medium if the temperature in the cold accumulator drops below a predetermined value, said cold accumulator being so dimensioned as to suffice in maintaining the temperature required in the cooling chamber if in the case of a heating period failing, the next following production of cold is initiated after the next following heating period.

14. A refrigerating system of the intermittently operating absorption type comprising an air-cooled generator-absorber, an air-cooled condenser, a collecting vessel for the liquid refrigerant, an evaporator connected to said vessel and connections for conveying the refrigerant from the generator-absorber to the evaporator and vice versa, a cooling chamber insulated from said vessel, a cold accumulator insulated both from said cooling chamber and said collecting vessel, said evaporator being in heat exchange relation with said cold accumulator, a medium in said cold accumulator for storing up the refrigeration produced during the absorption period, and means for transferring refrigeration as may be required from the accumulator to the cooling chamber, the cold accumulator being so dimensioned that the refrigeration stored up during the absorption period suffices to maintain in the cooling chamber the desired temperature also during the heating period.

15. A refrigerating system of the intermittently operating absorption type in which solid absorbents are employed which form a chemical compound with the refrigerant, comprising an air-cooled generator-absorber, an air-cooled condenser, a collecting vessel for the liquid refrigerant, an evaporator connected to said vessel and connections for conveying the refrigerant from the generator-absorber to the evaporator and vice versa, a cooling chamber insulated from said vessel, a cold accumulator insulated both from said cooling chamber and said collecting vessel, said evaporator being in heat exchange relation with said cold accumulator, a medium in said cold accumulator for storing up the refrigeration produced during the absorption period, and means for transferring refrigeration as may be required from the accumulator to the cooling chamber, the cold accumulator being so dimensioned that the refrigeration stored up during the absorption period suffices to maintain in the cooling chamber the desired temperature also during the heating period.

16. In a refrigerating system of the periodic absorption type, a cooling chamber, a cold accumulator insulated therefrom and having therein a medium for storing up the cold produced during the absorption period, an evaporator arranged in said cold accumulator, means for transferring refrigeration from the cold accumulator to the cooling chamber comprising a cold absorbing part arranged in the accumulator aforesaid and a refrigeration supplying part in the cooling chamber, means for producing ice in the cold accumulator, and heat radiating elements common to the evaporator, the cold absorbing part of the transfer system and the ice producing means aforesaid.

WULFF BERZELIUS NORMELLI.